Dec. 1, 1953

S. G. ESKIN ET AL 2,661,013

DIAPHRAGM VALVE CONTROL

Filed Feb. 4, 1950

INVENTORS.
SAMUEL G. ESKIN &
BY ROBERT C. MAIN.

their ATTORNEY.

INVENTORS.
SAMUEL G. ESKIN &
ROBERT C. MAIN.
BY Albert J. Henderson
their ATTORNEY.

Dec. 1, 1953   S. G. ESKIN ET AL   2,661,013
DIAPHRAGM VALVE CONTROL
Filed Feb. 4, 1950   3 Sheets-Sheet 3
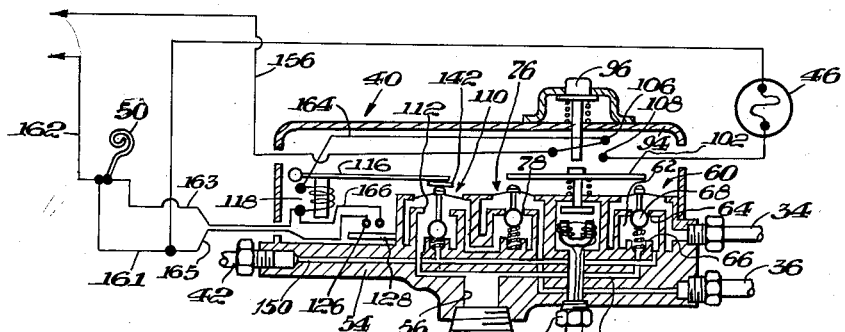
Fig. 4.
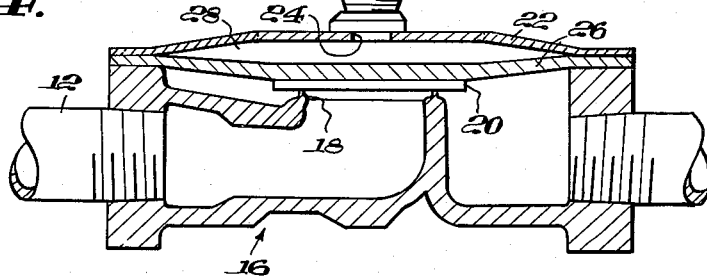
Fig. 5.
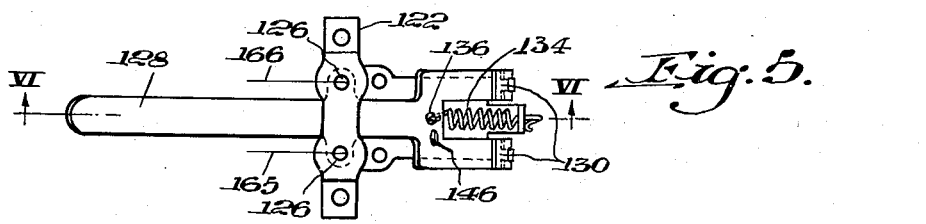
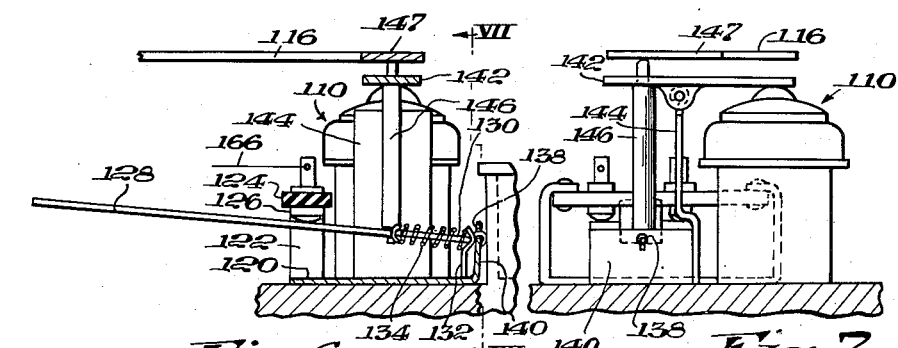
Fig. 6.   Fig. 7.
INVENTORS
SAMUEL G. ESKIN, &
ROBERT C. MAIN.
BY Albert J. Henderson
their ATTORNEY.

UNITED STATES PATENT OFFICE 2,661,013

DIAPHRAGM VALVE CONTROL

Samuel G. Eskin, Greensburg, Pa., and Robert C. Main, Boston, Mass., assignors to Robertshaw-Fulton Controls Company, Greensburg, Pa., a corporation of Delaware Application February 4, 1950, Serial No. 142,374

10 Claims. (Cl. 137—66)

The valve control of this invention is employed in conjunction with main and pilot burners to be safely lighted and controlled to maintain a desired temperature in a space to be heated. More particularly, the system includes electric ignition for the pilot burner and an automatic shut-off of all fuel supply in the event of extinguishment of the flame.

A preferred embodiment of the invention comprises a momentary bleed type diaphragm valve adapted for controlling fuel flow to the main burner and having the automatic pilot and igniter control associated therewith as a separate unit. The outlet to the pilot burner is controlled by the first of a pair of control valves, the second of which controls the exhaust from the pressure chamber of the diaphragm valve. A thermomagnetic type actuator governs the position of the pair of control valves in accordance with flame conditions at the pilot burner but is manually actuable for starting purposes at which time the igniter is concurrently energized.

A third control valve is provided for controlling the bleed outlet independently of the second control valve. This third control valve is governed by a room thermostat operating through a relay and causes opening and closing of the diaphragm valve for controlling the main burner in accordance with temperature conditions in the space being heated. A manual-set automatic-reset device insures operation in the event of power failure while retaining the safety features.

From the foregoing brief description it will be apparent that among the objects of the invention is the complete control of the main and pilot burners by mechanism operating in conjunction with a standard form of diaphragm valve.

Another object of the invention is to ensure safe lighting of the pilot burner by maintaining the diaphragm valve closed during the resetting operation.

Another object of the invention is to embody the device having the operational features and functions described in a small compact unit incorporating interchangeable parts.

Other objects and advantages of the invention will be apparent from the accompanying specification and claims taken in connection with the drawings, wherein—

Figs. 2, 3 and 4 are enlarged sectional views of the diaphragm valve control shown in different operating positions;

Fig. 5 is an enlarged plan view of a detail;

Fig. 6 is a section taken on line VI—VI of Fig. 5, and

Fig. 7 is a side elevation corresponding to Fig. 6.

Figure 1:
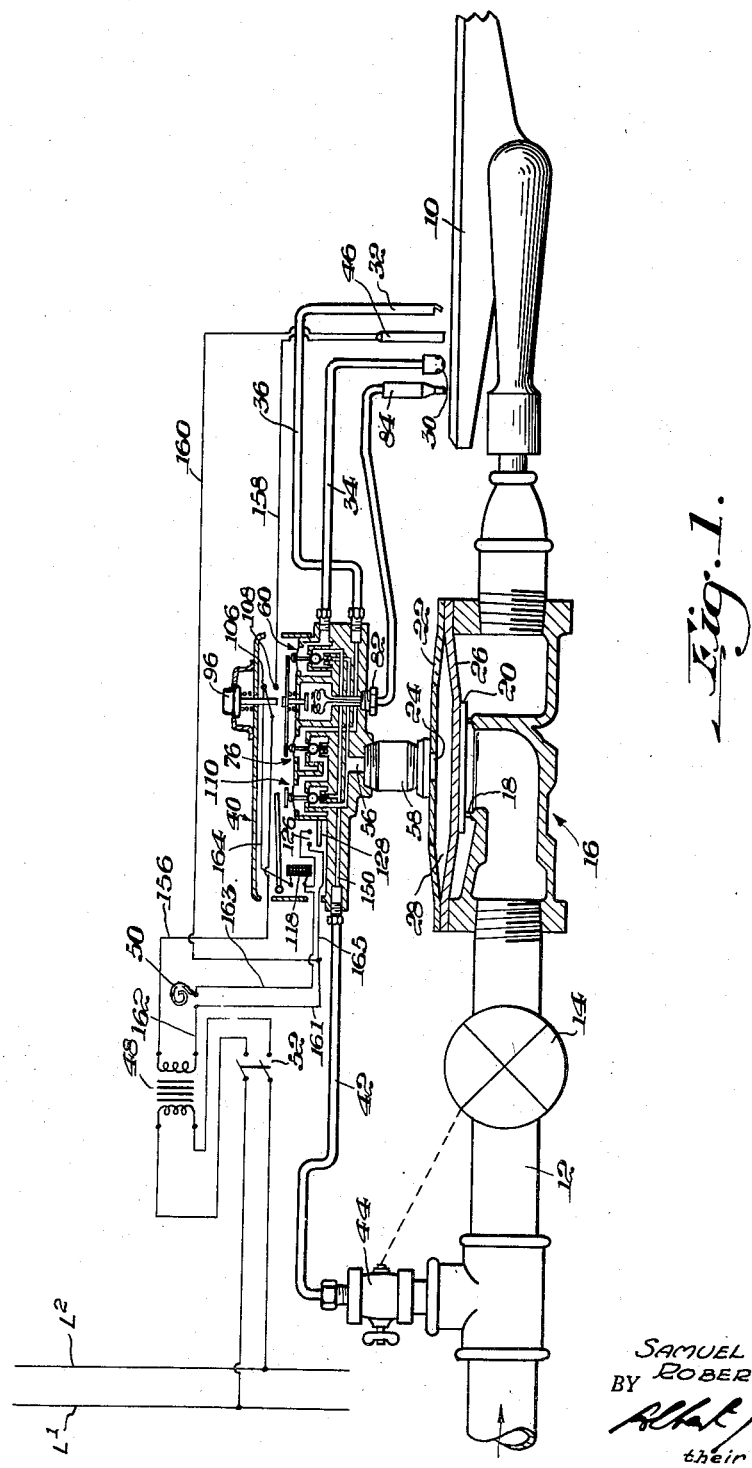
Fig. 1 is a sectional, schematic view of the valve control of this invention employed in conjunction with a fuel burner installation.

Referring more particularly to Fig. 1 of the drawings, a main fuel burner 10 is shown as being supplied with fuel by a main fuel pipe 12 under control of the usual main fuel cock 14. Interposed in the fuel supply pipe 12 between the main fuel cock 14 and the main burner 10 is a diaphragm valve 16 of the momentary bleed type having a valve seat 18 and cooperating valve member 20 for controlling flow of fuel to the main burner 10.

The diaphragm valve 16 is provided with a bonnet 22 having an opening 24 therein. A flexible diaphragm 26 is secured in position by the bonnet 22 and serves as the actuating means for the valve member 20. The opening 24 communicates with the space between the bonnet 22 and the diaphragm 26 which forms a pressure chamber 28.

A pilot burner 30 and a bleed fuel burner 32 are shown as associated with the main burner 10. These burners 30 and 32 receive fuel by way of conduits 34 and 36 respectively connected to the valve control device of this invention, which is designated generally by the reference numeral 40. A pilot supply conduit 42 for the valve control device 40 communicates with the main fuel pipe 12 ahead of the main gas cock 14 under control of a pilot fuel cock 44. Preferably, the main fuel cock 14 and the pilot fuel cock 44 are interlocked as indicated in broken lines of Fig. 1 of the drawings so that the latter cannot be closed unless the main fuel cock 14 is also closed. As this feature forms no part of the present invention further description is deemed unnecessary.

An electric igniter 46 of the hot wire type is located in lighting proximity of the pilot burner 30. The igniter 46 may be energized through a step-down transformer 48 from a suitable source of commercial current supply indicated by the line wires L1 and L2. The electric circuit from this source will be described more particularly in connection with the operation of the valve control device 40 and may include the usual room thermostat 50 which opens its contacts on a rise in temperature. A conventional double-pole single-throw switch 52 is included in the circuit of the primary of the transformer 48 as a main control switch.

*Diaphragm valve control*

The diaphragm valve control 40 will now be described in detail and is more clearly shown in the enlarged scale views Figs. 2, 3 and 4.

Accordingly, the valve control 40 comprises a main casing 54 having a central opening 56 in its underside which is adapted for communication with the opening 24 in the diaphragm valve 16 by means of a nipple connection 58 which also serves to connect the parts together. The casing 54 houses a plurality of control valve means for controlling the operation of the diaphragm valve member 16 to afford an automatic shut-off of all fuel supply in the event of extinguishment of the flame at the pilot burner 30 and also to control the main burner 10 in accordance with temperature conditions as sensed by the room thermostat 50.

To this end, a first control valve means, designated generally by the reference numeral 60, is provided at the right-hand end of the casing 54 as viewed in the drawings and comprises a valve chamber 62 having a pair of axially aligned valve seats 64, 66 at opposite ends thereof. A ball valve member 68 is reciprocable in the valve chamber 62 for cooperation alternatively with the valve seats 64, 66 and is biased into engagement with the seat 64 by a coil spring 70. A valve stem 72 projects from the valve member 68 past the valve seat 64 to the exterior of the casing 54. Suitable sealing means such as a flexible diaphragm 74 is provided at the projecting end of the valve stem 72 for sealing the casing 54 against leakage at this point.

A second control valve means, designated generally by the reference numeral 76, is located in the casing 54 laterally of the first control valve means 60. This second control valve means 76 differs from the first control valve means 60 only by provision of a single valve seat 78 comparable to the valve seat 64 of the first control valve means 60. Accordingly, further description of the second control valve means 76 is deemed unnecessary particularly in view of the fact that both control valve means 60 and 76 are operated as a unit by means now to be described.

A magnet housing 80 is formed in the casing 54 intermediate the first and second control valve means 60 and 76 and communicates with a connection 82 for a thermocouple 84 which is located to be heated by a flame from the pilot burner 30. Electromagnetic means comprising a U-shaped electromagnet 86 and the usual winding 88 therefor are positioned in the magnet housing 80 for energization through the connection 82 by the thermocouple 84. An armature 90 having a stem 91 is movable into attracted position relative to the pole faces of the magnet 86 by a reset stem 92 which projects exteriorly of the casing 54 for this purpose. A cover 94 extends across the casing 54 for enclosing the valve mechanism therein and is suitably perforated for the reception of the reset stem 92.

A reset button 96 is affixed to the terminal end of the reset stem 92 and cooperates with a housing 98 secured to the cover 94 for limiting retraction of the armature stem 92 under bias of a coil spring 100. In the biased position shown in Figs. 1, 3 and 4 the reset stem 92 is spaced from the armature stem 91. The reset button 96 projects exteriorly of the housing 98 for free manual operation during the resetting operation to move the armature 90 into attracted position relative to the pole faces of the magnet 86.

An operating bar 102 is carried by the armature stem 91 for operative engagement with the projecting ends of the valve stems 72 of both control valve means 60, 76. A coil spring 103 is operative between the bar 102 and the magnet housing 80 for biasing the armature 90 to released position. A switch arm 104 is shown as operable by the reset stem 92 into engagement with either one of a pair of contacts 106, 108 depending on whether the button 96 is retracted or pushed inwardly respectively.

A third control valve means, designated generally by the reference numeral 110, is positioned laterally of the second control valve means 76 and is similar in construction to the first control valve means 60 inasmuch as a pair of spaced valve seats 112, 114 respectively is provided. As in the case of the first control valve means 60, the third control valve means 110 is biased into engagement with the seat 112 but is reciprocable into engagement with the seat 114 to control flow of fuel thereby. Such operation is effected by a pivoted armature 116 of a control relay 118 which has its free end overlying the third control valve means 110 for operation thereof upon energization of the winding 119 of the relay 118. As will be hereinafter apparent, the control relay 118 receives electric energy from the commercial source L1, L2 and is subject to energization and deenergization by operation of the room thermostat 50.

A lever mechanism, shown more clearly in Figs. 5–7 of the drawings, is provided for manual operation of the third control valve means 110 in the event of an electric power failure. Positioned adjacent the third control valve means 110 is a frame member 120 of sheet material carrying at one end a pair of upstanding arms 122 to which an insulating member 124 is secured. A pair of contacts 126 is arranged in spaced relation on the insulating member 124 for engagement by a pivoted operating arm 128 to close a circuit therethrough. The operating arm 128 extends from the exterior of the cover 94 across the frame 120 and terminates in a pair of knife-edges 130 which engage with knife-edge bearings 132 upstanding from the frame 120. One end of a coil spring member 134 engages with a wall of an aperture 136 formed in the operating arm 128 while the opposite end thereof is engaged with the wall of an aperture 138 formed in the end wall 140 of the frame 120. The arrangement provides a simple overcenter snap-action device as will be apparent to those skilled in the art.

A lever member 142 is pivoted intermediate its ends on a support 144 forming a partial side wall for the frame 120. One end of the lever member 142 is interposed between the free end of the pivoted armature 116 and third control valve means 110. The opposite end of the lever member 142 is supported on a shaft 146 projecting substantially perpendicularly from the operating arm 128 and being adapted to rotate the lever member 142 on its pivot 144 when the operating arm 128 is manually operated as will hereinafter be described. A reduced end of the pin 146 projects through the lever member 142 into operative engagement with a projection 147 on the relay armature 116 whenever the operating arm 128 is in its upward operating position as shown in Figs. 6 and 7 of the drawings.

The three control valve means 60, 76 and 110 of this invention are adapted to control the flow of fuel to various passages formed in the casing 54 depending on the positions which these valves assume. Thus, one passage 148 of a pair serves as an exhaust for the pressure chamber 28 and may be traced on Fig. 3, for example, from the opening 56 to the valve chamber of the third control valve means 110; past the upper valve seat 112 therein to the valve chamber of the second control valve means 76; past the valve seat 78 therein, and through the casing 54 to the connection of the conduit 36 for the bleed pilot burner 32.

The other passage 150 of the pair forms the main inlet for fuel to all the various passages in the casing 54. Thus, passage 150 serves as the inlet and outlet in the casing 54 for fuel to the pilot burner 30 and may be traced on either Fig. 2 or 3 from the connection of the pilot supply conduit 42 at the left-hand side of the casing 54 to the opposite side thereof; entering the valve chamber 62 of the first control valve means 60; and passing the upper valve seat 64 thereof to the connection of the conduit 34 for the pilot burner 30.

A third passage 152 serves to supply fuel to the pressure chamber 28 and may be traced on Figs. 1 and 4 from the pilot supply conduit 42; passage 150; valve chamber 62 of the first control valve means 60; and past the lower valve seat 66 to the opening 56 which communicates with the opening 24 in the diaphragm valve bonnet member 22. A supplemental means for supplying fuel under pressure to the pressure chamber 28 under certain conditions to be described is provided by forming a port 154 in the casing 54 to connect the passage 150 with the valve chamber of the third control valve means 110 when under its bias for disengaging the lower valve seat 114 as shown in Figs. 1 and 2 for example.

*Operation*

The various elements are shown in Fig. 1 of the drawings in the positions which they assume when the main burner 10 is shut-off and the pilot burner 30 is extinguished. It may be assumed, therefore, that to start operation of the system the main valve switch 52 is closed and the main and pilot fuel cocks 14 and 44 respectively are placed in open position. Hence, fuel under pressure flows through the pilot conduit 42, passage 150, chamber 62 of the first control valve 60, past lower valve seat 66, and third passage 152 to the opening 56 in the casing 54. Since the second control valve means 76 is in its biased position, then the exhaust passage 148 is closed at this point and no fuel can escape to the bleed pilot burner 32. The third control valve means 110 may be either in its biased position or otherwise at this time depending on the condition of the room thermostat 50. The pressure now builds up in the pressure chamber 28 and serves to maintain the diaphragm valve member 20 in closed position relative to the valve seat 18.

Figure 2:
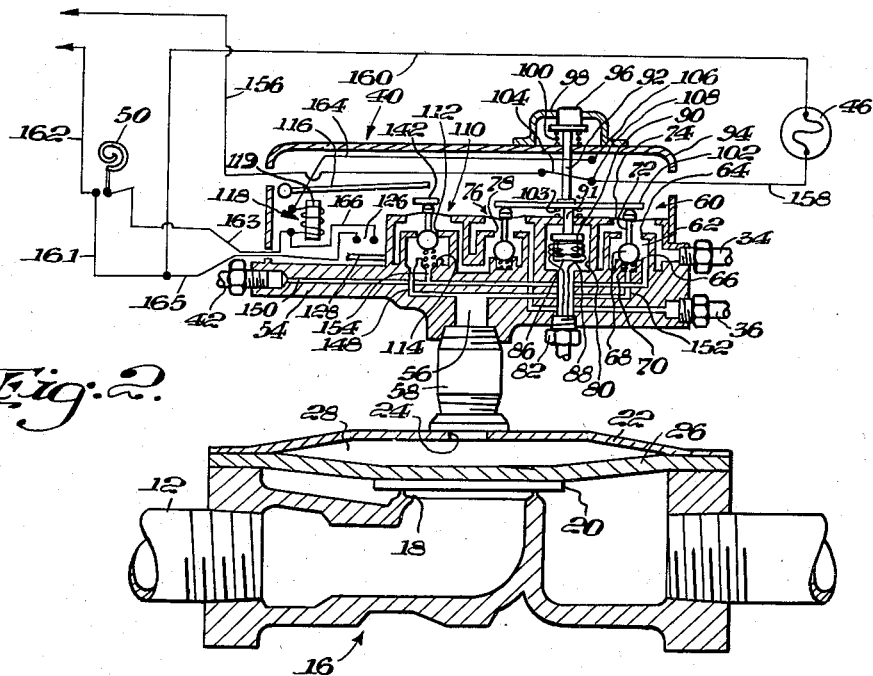

A pilot igniting operation can now be accomplished by manually pushing in the reset button 96 which serves to position the parts as shown in Fig. 2 of the drawings. As will be apparent, the switch arm 104 moves with the reset stem 92 out of engagement with the contact 106 and into engagement with the contact 108 and thereby a circuit for the igniter 46 is established. This circuit may be traced from the upper terminal of the secondary of transformer 48, wire 156, switch arm 104, contact 108, wire 158, igniter 46, wire 160, wire 161 and wire 162 to the lower terminal of the secondary of transformer 48.

Concurrently with the energization of the igniter 46, fuel can flow to the pilot burner 30 due to movement of the operating bar 102 by the reset stem 92 which serves to overcome the bias of the first and second control valve members 60 and 76 respectively. Fuel now passes from the pilot conduit 42 through passage 150, valve chamber 62, past upper valve seat 64 of the first control valve means 60 to the connection of the pilot burner conduit 34 and thus to the pilot burner 30 where it is ignited by the igniter 46. It should be observed that during this operation the third valve control means 110 is in its biased position so that no fuel can be exhausted from the pressure chamber 28 by way of exhaust passage 148. Such biased position is insured by the effective deenergization of the relay 118 as soon as switch arm 104 becomes disengaged from contact 106 during the resetting operation as will later be apparent. Moreover, the chamber 28 is still supplied with fuel under pressure by way of pilot supply connection 42, passage 150, port 154, past the lower valve seat 114 of the third control valve means 110, and passage 148 to openings 56 and 24. Thus, the flow of fuel to the main burner 10 is still cut-off and safe lighting of the pilot burner occurs.

Upon elapse of sufficient time for the thermocouple 84 to become heated by the flame at the pilot burner 30, then the electromagnetic means 86, 88 becomes energized. The armature 90 was previously moved into engagement with the pole faces of the magnet 86 due to the described operation of the reset button 96 and will remain in attracted position upon release of the reset button which may now occur. The reset stem 92 moves to its normal retracted position under bias of the spring 100.

Since the operating bar 102 is held against the bias of the armature spring 103 by the magnet 86, the control valve means 60 and 76 are also retained against the respective bias thereof in the position shown in Fig. 2 of the drawings. However, the switch arm 104 is moved by the retraction of the reset stem 92 to its initial position for engagement with contact 106. The igniter 46 is thus deenergized by opening of its circuit previously traced. The position of the diaphragm valve member 20 now depends solely on the position of the third control valve means 110 and this in turn is dependent upon the position of the room thermostat 50 as will now be described.

Figure 3:
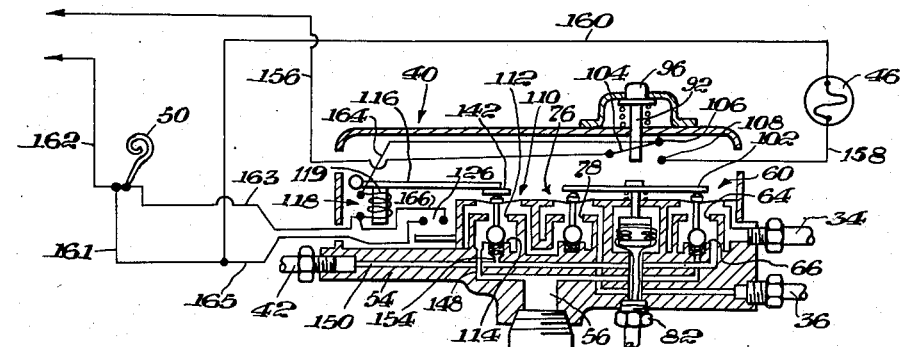

Assuming that the thermostat 50 is calling for heat then the contacts thereof become closed as shown in Fig. 3 of the drawings. Such operation establishes a circuit for the relay 118 which may be traced as follows: lower terminal of secondary of transformer 48, wire 162, contacts of thermostat 50, wire 163, relay winding 119, wire 164, contact 106, switch arm 104, and wire 156 to the upper terminal of transformer secondary 48.

The parts are now assumed to be in the positions shown in Fig. 3 of the drawings. The bias of the third control valve means 110 is overcome by the movement of the relay armature 116 to its attracted position so that the lower valve seat 114 becomes engaged. Consequently, the one passage 148 is now open for exhaust of fluid from the chamber 28 by way of the openings 24 and 56, passage 148, past valve seat 112 of the third control valve means 110, past valve seat 78 of the second control valve means 76, and through the casing 54 of the connection of the bleed circuit 36. The small amount of fuel thus exhausted is consumed at the bleed burner 32 and is momentary only.

Inasmuch as the chamber 28 now contains no fuel under pressure the diaphragm valve member 29 is raised from engagement from the valve seat 18 of the diaphragm valve member 16 by the line pressure existing in the main fuel supply pipe 12. The main burner 10 now receives a supply of fuel which is ignited by the flame from the pilot burner 30 and the system remains in operation until the room thermostat 50 opens its contacts upon a sufficient rise in temperature.

When the relay 118 thus becomes deenergized by opening of the contacts of the room thermostat 50 then the relay armature 116 returns to its released position and the third control valve means 110 returns to its biased position in engagement with the valve seat 112 as shown in Fig. 2 of the drawings. Consequently, the bleed outlet is closed and fuel pressure is permitted to build up in the pressure chamber 28 until the diaphragm 29 moves into engagement with the valve seat 18. Hence, the flow of fuel to the main burner 10 is cut-off by operation of the room thermostat 50.

In the event that the flame at the pilot burner 30 is extinguished during normal conditions then the thermocouple 84 ceases to generate electrical energy. The armature 90 returns to its initial released position under bias of the spring 103 and the first and second control valve means 60, 70 respectively return to their biased positions. Thus, should the room thermostat 50 be in position with its contacts closed then the parts assume the positions shown in Fig. 4 of the drawings. It will be observed that the second control valve means 70 is in closed position relative to the upper valve seat 78 so that the bleed outlet previously traced is also closed. Inasmuch as the first control valve means 60 is also closed relative to the upper valve seat 64, then the supply passage to the chamber 28 on top of the diaphragm valve member 20 is opened. It is thus apparent that irrespective of the position of the third control valve means 110 the flow of fuel to the main burner 10 is immediately cut-off by the automatic pilot upon extinguishment of the flame at the pilot burner 30.

However, in the event of a failure of electric power during operation, means have been provided to ensure continuous running of the main burner 10 by a manual operation. Referring more particularly to Figs. 5, 6 and 7 of the drawings it will be apparent that raising the operating lever 128 to the position shown in Fig. 6, for example, will serve to close the contacts 126 and also move the lever 142 sufficiently to overcome the bias of the third control valve means 110. As such operation of the lever 128 is beyond its dead center point then the overcenter spring 134 comes into operation to retain the lever 128 in its raised position. The parts are thus manually brought to the position shown in Fig. 3 insofar as the third control valve means 110 is concerned. Consequently, the fluid pressure existing in chamber 28 is exhausted and the diaphragm valve member 29 moves to its open position to supply fuel to the main burner 10 as in normal operation.

Upon restoration of electric power after manual operation of the lever 128 then the relay 118 is immediately energized irrespective of the position of the contacts of the room thermostat 50. Such energization of the relay 118 occurs due to the prior completion of a parallel circuit through the contacts 126 by operation of the lever 128. Thus, starting at the lower terminal of the secondary of transformer 48, the circuit is by way of wire 162, wire 161, wire 165, contacts 126, wire 166, relay 118, wire 164, contact 106, switch arm 104, and wire 156 to the upper terminal of the secondary of transformer 48. However, when the relay armature 116 is attracted by the relay 118, the projection 147 thereon moves into engagement with the projecting end of the pin 146 to force the lever 128 downwardly past its dead center position with snap-action as is usual in such constructions. Thus the device is automatically reset upon resumption of electric current supply without attention on the part of the operator. It should be observed that during manual operation of the control in the absence of power supply that the automatic pilot continues in normal operation due to its separate source of current supply by way of the thermocouple 84.

Since the only fuel which is conveyed through the novel diaphragm valve control is that required for supplying the pilot burner 30 and the momentary bleed burner 32 it is apparent that the fuel capacity of the device is relatively insignificant. Moreover, the valve control is readily installed on various standard forms of diaphragm valves and can be used to control gas appliances of any size.

Although a specific embodiment of the invention has been shown and described it will be apparent that many modifications may be made by those skilled in the art. Such modifications may be made in the details of construction and arrangement of parts without departing from the scope of the invention as set forth in the appended claims.

We claim:

1. In combination with a diaphragm valve having a fluid pressure chamber with a wall movable in response to pressure variations and valve means operatively connected to the wall, a casing having an opening adapted for communication with said chamber, said casing having a pair of passages therein one of which communicates with said opening for exhaust of fluid from said chamber, said other passage providing an inlet and outlet for fluid under pressure in said casing, a first control valve means biased to a position for closing said outlet, second control valve means biased to a position for closing said one passage, third control valve means biased to a position for likewise closing said one passage, said casing having a third passage therein connecting said first control valve means in said biased position thereof with said opening for supply of fluid to said chamber, said first control valve means being effective for closing said third passage in the unbiased position thereof operating means movable to one position for overcoming the bias of said first and second control valve means for opening said outlet and concomitantly closing said third passage, and second operating means operable for overcoming the bias of said third control valve and opening said one passage for exhaust of fluid from said chamber.

2. In combination with a diaphragm valve having a fluid pressure chamber with a wall movable in response to pressure variations and valve means operatively connected to the wall, a casing having an opening adapted for communication with said chamber, said casing having a pair of passages therein one of which communicates with said opening for exhaust of fluid from said chamber, said other passage providing an inlet and outlet for fluid under pressure in said casing, a first control valve means biased to a position for closing said outlet, second control valve means biased to a position for closing said one passage, third control valve means biased to a position for likewise closing said one passage, said casing having a third passage therein connecting said first control valve means in said biased position thereof with said opening for supply of fluid to said chamber, said first control valve means being effective for closing said third passage in the unbiased position thereof, said third control valve means having a port connecting said pair of passages in said biased position thereof for supply of fluid to said chamber independently of said third passage, said third control valve means being effective for closing said port in the unbiased position thereof, operating means movable to one position for overcoming the bias of said first and second control valve means for opening said outlet and concomitantly closing said third passage, and second operating means operable for overcoming the bias of said third control valve means and opening said one passage for exhaust of fluid from said chamber and for closing said port.

3. Valve control as claimed in claim 2 wherein means cooperable with the first said operating means are provided for rendering said second operating means inoperable while the first said operating means is in said one position.

4. Valve control as claimed in claim 2 wherein the first said operating means includes an electromagnet, means for energizing said electromagnet sufficiently to render the same effective for holding said first and second control valve means against the bias thereof but being incapable of moving the same to such position, and manually operable reset means for overcoming said bias and resetting said electromagnet for said holding operation.

5. Valve control as claimed in claim 4 wherein said second operating means includes a relay having an armature operatively associated with said third control valve means for opening said one passage upon energization of said relay, and switch means operatively associated with said reset means for preventing energization of said relay during the resetting operation.

6. In combination with a diaphragm valve having a fluid pressure chamber with a wall movable in response to pressure variations and valve means operatively connected to the wall, a casing having an opening adapted for communication with said chamber, said casing having a pair of passages therein one of which communicates with said opening for exhaust of fluid from said chamber, said other passage providing an inlet and outlet for fluid under pressure in said casing, a first control valve means having two controlling positions and being biased to a position for closing said outlet, second control valve means biased to a position for closing said one passage, third control valve means biased to a position for likewise closing said one passage, said casing having a third passage therein connecting said first control valve means in said biased position thereof with said opening for supply of fluid to said chamber, said first control valve means being effective for closing said third passage in the unbiased position thereof, operating means movable to one position for overcoming the bias of said first and second control valve means, said first control valve means being moved to the other controlling position thereof for opening said outlet and closing said third passage, said second control valve means being positioned for opening said one passage, and second operating means for overcoming the bias of said third control valve means and opening said one passage for exhaust of fluid from said chamber.

7. In combination with a diaphragm valve having a fluid pressure chamber with a wall movable in response to pressure variations and valve means operatively connected to the wall, a casing having an opening adapted for communication with said chamber, said casing having a pair of passages therein one of which communicates with said opening for exhaust of fluid from said chamber, said other passage providing an inlet and outlet for fluid under pressure in said casing, a first control valve means having two controlling positions and being biased to a position for closing said outlet, second control valve means biased to a position for closing said one passage, third control valve means having two controlling positions and being biased to a position for likewise closing said one passage, said casing having a third passage therein connecting said first control valve means in said biased position thereof with said opening for supply of fluid to said chamber, said first control valve means being effective for closing said third passage in the unbiased position thereof, said third control valve means having a port connecting said pair of passages in said biased position thereof for supply of fluid to said chamber independently of said third passage, said third control valve means being effective for closing said port in the unbiased position thereof, operating means movable to one position for overcoming the bias of said first and second control valve means, said first control valve means being moved to the other controlling position thereof for opening said outlet and closing said third passage, said second control valve means being positioned for opening said one passage, and second operating means operable for moving said third control valve means to the other controlling position thereof for opening said one passage and closing said port.

8. Valve control as claimed in claim 7 wherein means cooperable with the first said operating means are provided for rendering said second operating means inoperable while the first said operating means is in said one position.

9. In combination with a diaphragm valve having a fluid pressure chamber with a wall movable in response to pressure variations and valve means operatively connected to the wall, a casing having an opening adapted for communication with said chamber, said casing having a pair of passages therein one of which communicates with said opening for exhaust of fluid from said chamber, said other passage providing an inlet and outlet for fluid under pressure in said casing, a first control valve means having two controlling positions and being biased to a position for closing said outlet, second control valve means biased to a position for closing said one passage, third control valve means having two controlling positions and being biased to a position for likewise closing said one passage, said casing having a third passage therein connecting said first control valve means in said biased position thereof with said opening for supply of fluid to said chamber, said first control valve means being effective for closing said third passage in the unbiased position thereof, said third control valve means having a port connecting said pair of passages in said biased position thereof for supply of fluid to said chamber independently of said third passage, electromagnetic means positioned in said casing and having a relatively movable armature biased to a released position, means for energizing said electromagnetic means sufficiently to render the same effective for holding said armature in attracted position but being incapable of moving the same from said released position, manually operable reset means for moving said armature to attracted position, operating means carried by said armature and operatively engageable with said first and second control valve means for overcoming the bias thereof, relay means having a relay armature operatively associated with said third control valve means for overcoming the bias thereof upon energization of said relay, and switch means operatively associated with said reset means for preventing energization of said relay during the resetting operation.

10. Valve control as claimed in claim 9 wherein manually operable means operably engages said third control valve means and being effective for manual operation thereof to said other controlling position upon energy failure at said relay, said manually operable means including a yieldable connection, said relay armature being effective upon reenergization of said relay for overcoming said connection and rendering said manually operable means ineffective.

SAMUEL G. ESKIN.
ROBERT C. MAIN.

References Cited in the file of this patent

UNITED STATES PATENTS

| Number | Name | Date |
|---|---|---|
| 2,161,248 | Denison | June 6, 1939 |
| 2,261,092 | Peterson | Oct. 28, 1941 |
| 2,333,913 | Beam | Nov. 9, 1943 |